W. E. GROVE.
MIRROR PIVOT.
APPLICATION FILED JAN. 3, 1911.

1,002,201.

Patented Aug. 29, 1911.

Witnesses

Inventor
William Emory Grove
By S. A. Gourick
Attorney

UNITED STATES PATENT OFFICE.

WILLIAM EMORY GROVE, OF NEW FREEDOM, PENNSYLVANIA, ASSIGNOR OF ONE-HALF TO HARRY G. SIELING, OF RAILROAD, PENNSYLVANIA.

MIRROR-PIVOT.

1,002,201. Specification of Letters Patent. Patented Aug. 29, 1911.

Application filed January 3, 1911. Serial No. 600,631.

*To all whom it may concern:*

Be it known that I, WILLIAM EMORY GROVE, a citizen of the United States, residing at New Freedom, in the county of York and State of Pennsylvania, have invented certain new and useful Improvements in Mirror-Pivots, of which the following is a specification.

My invention relates to devices for hanging swinging mirror frames in their supports on dressers, chiffonniers and the like, and has for its object the provision of a device by which the mirror frame may be quickly removed and replaced on its support, and when the mirror is in place will permit of adjusting the mirror at any angle desired and will retain the mirror in adjusted positions until moved. The device is furthermore inconspicuous when in place and extremely reasonable in cost of manufacture.

My invention will be described in detail hereinafter and illustrated in the accompanying drawings in which—

Figure 1:
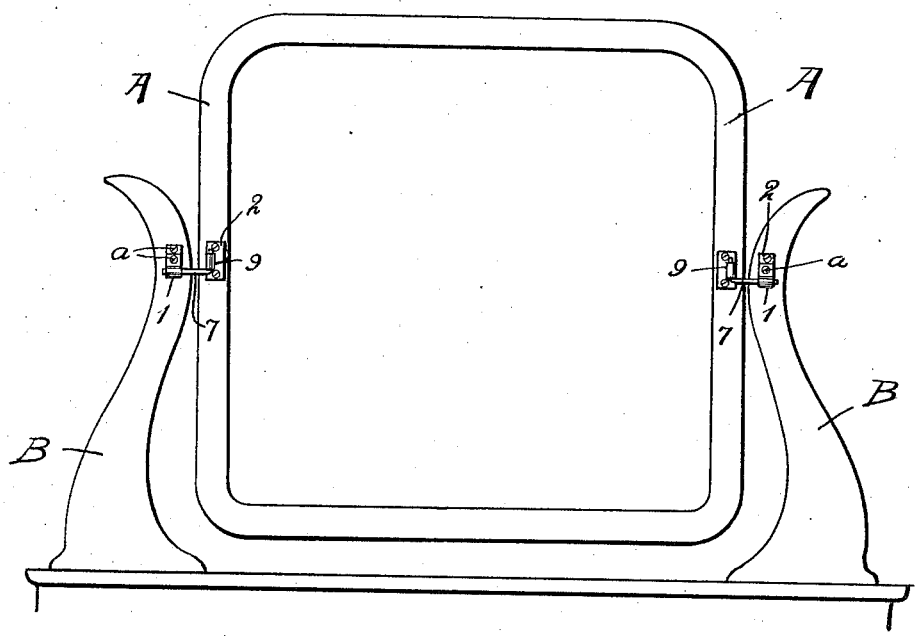
Figures 2, 3, 5:
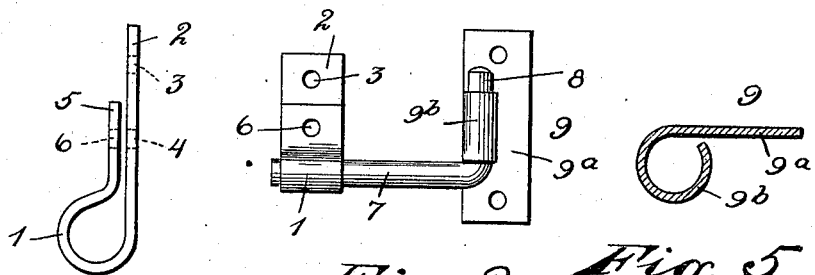

Figure 1 is a rear view of a mirror and its support showing my improved pivot in position. Fig. 2, an enlarged view of the pivot, assembled, Fig. 3, an edge view of one of the friction sleeves detached, Fig. 4, a side view of the pivot pin, and Fig. 5 a cross section of the socket member.

In the drawings similar reference characters will be used to designate corresponding parts in the several views.

My invention is as stated to be used in hanging mirror frames on dressers, chiffonniers and the like and in Fig. 1 my improved pivot is shown in use on a mirror frame A hung on standards B.

Figure 4:
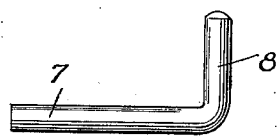

The improved pivot consists of three members illustrated separately in Figs. 3, 4 and 5. The friction sleeve shown in Fig. 3 is secured to the standards B either in the position shown in Fig. 1 or reversed, the position being governed by the design of the standards and the height of the mirror frame, and consists of a single piece of material bent intermediate of its ends to form a cylindrical sleeve 1, the two ends extending from said sleeve being of unequal lengths as shown, the longer one 2 being the base and provided with two screw holes 3 and 4 while the shorter end 5 is formed with a single hole 6.

The pivot pin shown in Fig. 4 is substantially L-shaped as shown and consists of the two arms 7 and 8, the arm 7 being rotatably mounted in sleeve 1 and being frictionally engaged thereby, while the other arm 8 fits in a socket member 9 secured to the back of the mirror frame, said socket member consisting of a base plate 9ª having a screw hole at each end thereof and a socket 9ᵇ formed intermediate of its ends.

In use the pivot members are assembled as shown in Fig. 1, the frictional engagement of the sleeves 1 with the arms 7 of the pivot pins being regulated by tightening or releasing the screws $a$ through holes 4 and 6 so that the mirror frame A when in place may be adjusted to different angles as desired and will remain in the position placed, the frictional engagement of the sleeves and pins being sufficient to overcome the force of gravity tending to return the mirror to an upright position. Also it will be apparent that the mirror frame may be removed quickly by lifting it so that the socket members disengage the arms 8, and may be as quickly replaced when desired, this feature being especially desirable in packing the mirror frame for shipment and in moving the article of furniture from place to place.

Having thus described my invention what I claim is—

In combination with a mirror frame and its supports, horizontally disposed friction sleeves secured to the supports, each of said sleeves consisting of a single piece of material bent intermediate of its ends to form a cylindrical sleeve, the two ends of said material provided with alined holes to receive a driven fastening, a pivot pin rotatably mounted in each sleeve and frictionally engaged thereby, the frictional engagement of the sleeve and pin being adjusted by the driven fastening through the alined holes aforesaid, said pins having upwardly extending, angular extensions, and socket members secured to the mirror frame and removably and replaceably engaging the angular extensions aforesaid.

In testimony whereof I hereto affix my signature in the presence of two witnesses.

WILLIAM EMORY GROVE.

Witnesses:
WM. G. ALLEN,
J. A. W. GRAYBILL.

Copies of this patent may be obtained for five cents each, by addressing the "Commissioner of Patents, Washington, D. C."